Jan. 6, 1953 R. D. HANCOCK ET AL 2,624,848
GRAPH TRANSFORMATION DEVICE
Filed Nov. 23, 1951 2 SHEETS—SHEET 1
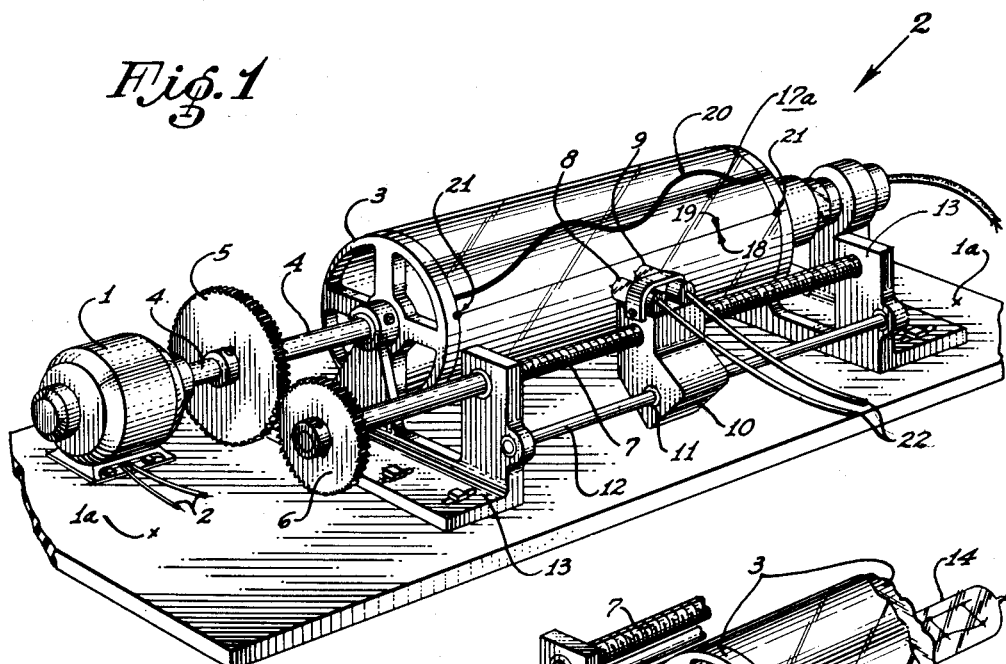
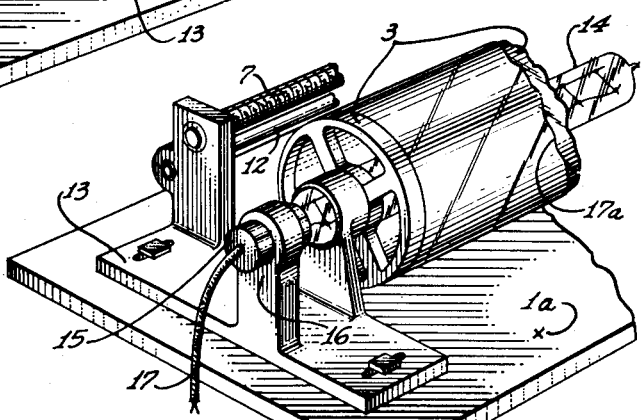
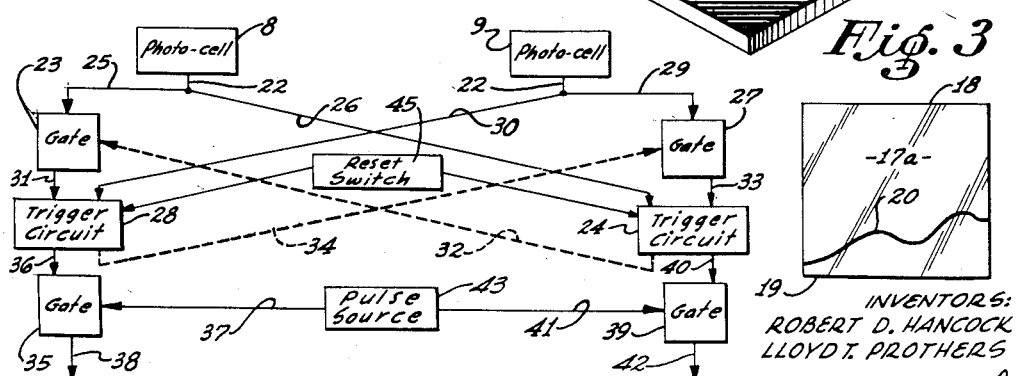
INVENTORS:
ROBERT D. HANCOCK
LLOYD T. PROTHERS
BY Herbert E. Metcalf
THEIR PATENT ATTORNEY Jan. 6, 1953     R. D. HANCOCK ET AL     2,624,848
GRAPH TRANSFORMATION DEVICE Filed Nov. 23, 1951     2 SHEETS—SHEET 2

INVENTORS:
ROBERT D. HANCOCK
LLOYD T. PROTHERS
By Herbert E. Metcalf
THEIR PATENT ATTORNEY Patented Jan. 6, 1953

2,624,848

UNITED STATES PATENT OFFICE 2,624,848

GRAPH TRANSFORMATION DEVICE

Robert D. Hancock, Compton, and Lloyd T. Prothers, Los Angeles, Calif., assignors to Northrop Aircraft, Inc., Hawthorne, Calif., a corporation of California Application November 23, 1951, Serial No. 257,918

3 Claims. (Cl. 250—208)

1

The present invention relates to function generators, and, more particularly, to optical means for generating a function in terms of pulses.

Among the objects of the invention are:

To provide a means for generating a function in terms of pulses.

To provide a function generator suitable for operating a computer.

To provide an optical means for generating a function in terms of pulses.

To provide a function generating system in which the function to be generated can readily be changed.

To provide a simple and accurate function generator.

In brief, the present invention in one form includes means for rotating a cylindrical graph having a graph line positioned on its surface that varies in distance from a base line as the relationship between an independent and a dependent variable. A duo-sensing device is provided, that causes an output in response to a passage of the graph line. The sensing device is driven along the graph in a direction parallel to the base line. Outputs, in pulse form, from each half of the sensing device are applied to a control circuit, thereby monitoring the output of a pulse generator. The controlled output pulses from the pulse generator represent a change in the value of the dependent variable per unit change of the independent variable.

The invention can be more fully understood by reference to the ensuing description of the attached drawings in which:

Figure 1 is a perspective view looking toward one end of one form of function generator embodying the present invention.

Figure 2 is a fragmentary perspective view of the other end of the device of Figure 1, viewed as indicated by the arrow 2 in Figure 1.

Figure 3 is a graph in planar coordinates of a function, suitable for use in conjunction with the machine of Figures 1 and 2.

Figure 4 is a block wiring diagram of the control circuit for use in conjunction with the output of the device of Figure 1.

Figure 5:
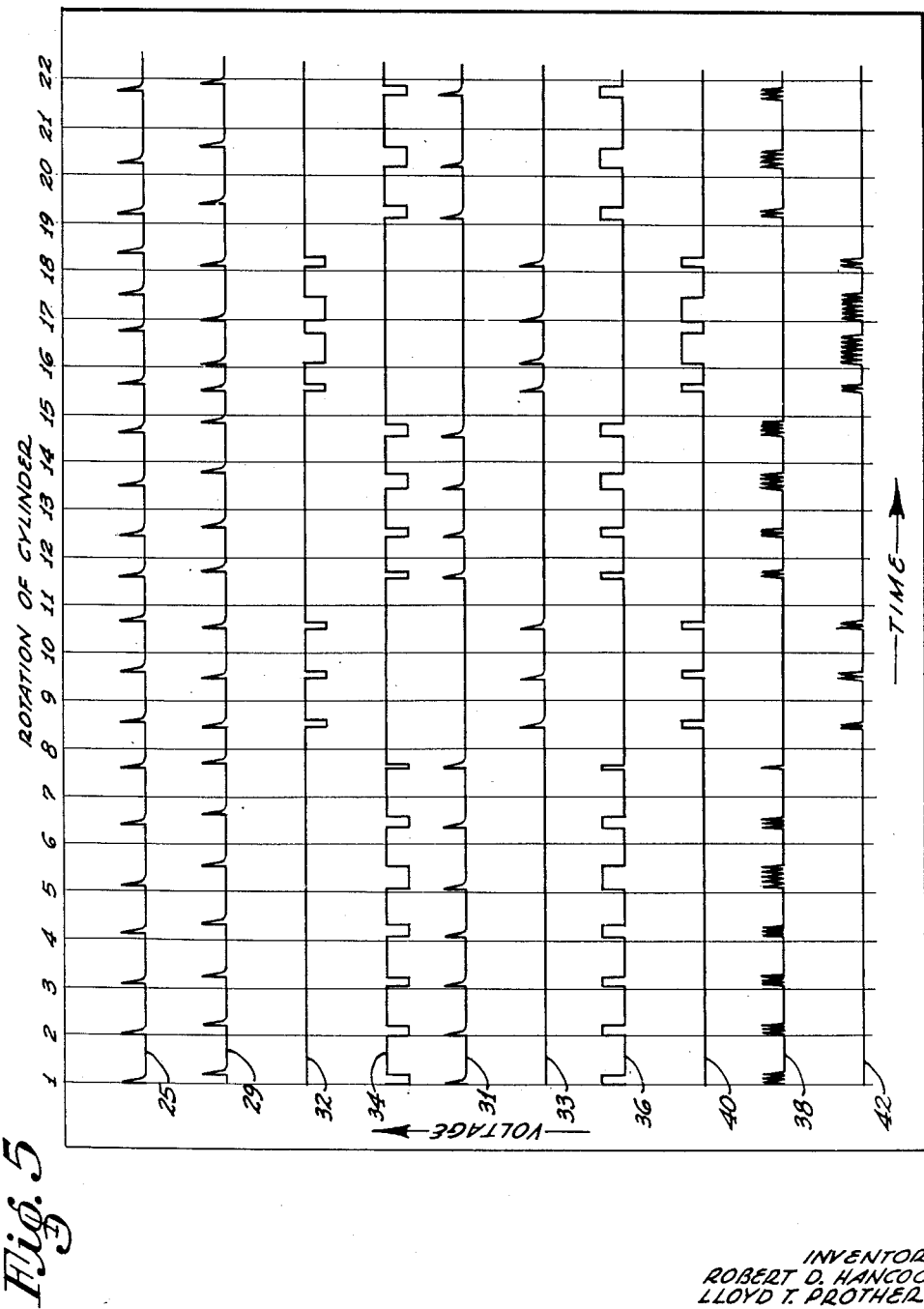
Figure 5 is a multiple graph indicating the occurrence of pulses and control voltages in a timewise sense for sections of the device of Figure 4.

Referring first to Figure 1, a motor 1, mounted on a main frame 1a, is connected to a power source by means of motor leads 2, and connected to a cylinder 3 by means of a shaft 4. The cylinder 3 is fashioned from a transparent or translucent material, glass for example. A drive gear 5 rigidly attached to shaft 4, and a driven gear 6, which is rigidly attached to a lead screw 7, mesh to transmit rotary motion from motor 1 to lead screw 7. Photocells 8 and 9 are rigidly attached to a traveling unit 10 having a support collar 11. The support collar 11 is slidably mounted on a guide bar 12, which is supported by guide bar supports 13, and unit 10 is internally threaded to mate with lead screw 7. Guide bar supports 13 rotatably hold the lead screw 7, also. Supports 13 are mounted on main frame 1a.

As can be seen in Figure 2, a lamp 14 is held in a position interior of cylinder 3, by means of a lamp socket 15 and a lamp support 16, on main frame 1a, and is illuminated by power supplied through lamp leads 17. Lamp support 16 maintains the position of lamp socket 15, hence lamp 14, such that the interior of cylinder 3 is substantially uniformly illuminated. If the device is several feet long, for example, the lamp 14 must be supported at both ends.

A graph 17a to be employed in the present invention is fashioned from a sheet of transparent or translucent material as best shown in Figure 3. Referring to Figure 3, values of an independent variable are made to be proportional to distances measured from left to right, along base line 18 or 19 of the graph 17a. Corresponding to each independent variable value is a dependent variable value which is laid off as a distance in a direction normal to base lines 18 and 19. The curve 20 is the result of plotting the dependent variable values for all independent variable values.

A preferred form of graph 17a consists of a transparent or translucent sheet of plastic material, treated such as to be either all opaque except along curve 20 or all light-transmission except along curve 20. The present invention can be designed to accept either of these graph forms without deviating from the novel features and advantages inherent in the present invention. Consequently, the ensuing discussion will refer to one form of graph, wherein a sheet of material is light-transmissive everywhere except along a fine opaque curve 20. The curve may be formed by painting, photographic printing, or like methods such that it acts as a discontinuity in the light transmission of the transparent or translucent sheet.

This graph 17a is then wrapped around the outside or inserted inside of the cylinder 3, as shown in Figure 1, so that the base lines 18 and 19 lie parallel to the axis of rotation of cylinder 3.

Index marks 21 on the extreme edges of cylinder 3, as shown in Figure 1, are positioned such that locating the two ends of either base line 18 or 19 on index marks 21 insures a parallel attitude between the base lines and the axis of rotation of the cylinder.

In positioning photocells 8 and 9 and in determining the lead of lead screw 7, the distance along base line 18 or 19 of the graph 17a for a unit change in the independent variable is the determining factor. The spacing between photocells 8 and 9 and the lead of lead screw 7 is made equal to the distance of a unit change of the independent variable as established on base lines 18 and 19 of the graph. In normal usage the graph employed in the present invention is specially developed such that it accepts the lead of lead screw 7 and the spacing of photocells 8 and 9 as the distance of a unit change in the independent variable; however, an exchange of lead screws and an adjustment of photocell spacing may be made in order to accommodate graphs not readily re-constructed to fit an existing configuration of the present invention.

Photocells 8 and 9 are attached to travelling unit 10 and oriented in either a parallel attitude or in an attitude that forms a small plane angle. If the distance of a unit change of the independent variable on the graph 17a demands that the distance between points of sensing of the graph by the photocells be so small as to make impractical a direct viewing of the graph by the photocells, an optical system, disposed between the photocells and the graph, may be utilized to overcome this obstacle of photocell location. Such an optical system may be mirrors or prisms located in the optical path of the photocells to direct their points of sensing on the graph to a desirable spacing distance.

Output leads 22 from the photocells 8 and 9 are connected to a control circuit as shown in Figure 4. Referring to Figure 4, photocell output leads 22 are divided such that an output from photocell 8 is applied to a gate 23 and a bi-stable trigger circuit 24 by means of leads 25 and 26, respectively, and an output from photocell 9 is applied to a gate 27 and to a bi-stable trigger circuit 28 by means of leads 29 and 30, respectively. Gating circuits and bi-stable trigger circuits are well known in the electronic computer art. Gate 23 either passes or does not pass an output from lead 25 to a lead 31 and is under the control of the state of trigger circuit 24 as conveyed by a control lead 32. Likewise, gate 27 either passes or does not pass an output from lead 29 to a lead 33 and is under the control of the state of trigger circuit 28 as conveyed by a control lead 34.

An output from lead 25 through gate 23 to lead 31 is applied to trigger circuit 28 such as to cause it to be triggered to or to continue to exist in a state that controls gate 27, by means of control lead 34, to cause gate 27 to prevent passage of an output from lead 29 to lead 33 and controls a gate 35, by means of a control lead 36, to cause gate 35 to permit passage of an output from a lead 37 to a lead 38. Simultaneous with the output in lead 25 there is an output in lead 26 which is applied to trigger circuit 24 to cause it to be triggered into a state or to continue to exist in a state that controls gate 23, by means of control lead 32, to cause gate 23 to permit passage of an output from lead 25 to lead 31 and controls a gate 39, by means of a control lead 40, to cause gate 39 to prevent passage of an output from a lead 41 to a lead 42.

An output from lead 29 through gate 27 to lead 33 is applied to trigger circuit 24 such as to cause it to be triggered to or continue to exist in a state that controls gate 23, by means of control lead 32, to cause gate 23 to prevent passage of an output from lead 25 to lead 31 and controls gate 39, by means of control lead 40, to cause gate 39 to permit passage of an output from lead 41 to lead 42. Simultaneous with the output in lead 29 there is an output in lead 30 which is applied to trigger circuit 28 to cause it to be triggered into a state or to continue to exist in a state that controls gate 27, by means of control lead 34, to cause gate 27 to permit passage of an output from lead 29 to lead 33 and controls gate 35, by means of control lead 36, to cause gate 35 to prevent a passage of an output from lead 37 to lead 38.

The gates and bi-stable trigger circuits of the control circuit are electronic devices, consequently the aforementioned outputs are single electrical pulses or groups of electrical pulses and the control exerted on the gates by the trigger circuits is accomplished by voltage variations in the control leads.

Leads 37 and 41 are the output leads from a continuous running pulse source 43; an oscillator and pulse former, for example.

The leads 38 and 42 are the output leads for the control circuit and are to be connected to a computer, for example (not shown). A reset switch 45 is provided for trigger circuits 24 and 28 to initially set both circuits in the state which closes gates 39 and 35, respectively. Pressing reset switch 45 prior to the start of each new operation will insure that there will be no output on leads 42 or 38 until the graph curve 20 properly demands an output from either side.

In operation, the motor 1 is energized by applying a proper voltage across motor leads 2. Rotation of the rotor of motor 1 causes rotation of shaft 4, drive gear 5, cylinder 3, driven gear 6, and lead screw 7. A cooperative action between traveling unit 10 and lead screw 7 causes a translation motion, parallel to the axis of rotation of cylinder 3, of the photocells 8 and 9, traveling unit 10, and the support collar 11. Guide bar supports 13 maintain the guide bar 12 in a desired position with respect to the cylinder 3. A co-action between guide bar 12 and support collar 11 prevents rotation of the photocells 8 and 9 while not impeding their translation motion.

As the cylinder 3 rotates, the photocells are advanced so that one revolution of the cylinder causes the photocells to move a distance equal to one increment of the independent variable as plotted. During a revolution of cylinder 3 light will be transmitted from the lamp 14, through the cylinder and the graph to the photocells. The light, as sensed by the photocells, will not be continuous, however, since the opaque curve 20 on the graph 17a will interrupt the light transmission to each photocell at least once every revolution, thereby causing a pulsed output in photocell leads 22.

It is evident that the sequence of occurrence of pulse outputs from photocells 8 and 9 and the time differential between them is a measure of the slope of the curve 20 on the graph at one value of the independent variable. After the traveling unit 10 has traveled the length of lead screw 7, stopping means is preferably provided, such as a limit switch (not shown), for example, positioned to be tripped by the unit 10. Also, the motor 1 should be reversible to provide a convenient means of return to the original starting position of the traveling unit.

As cylinder 3 rotates and photocells 8 and 9 are advanced, the paths on the graph 17a that are traversed by the photocells are two identical helices; these helices are superimposed since the advance of the photocells per revolution of the cylinder is equal to the effective spacing between the photocells. Consequently, the above mentioned slope measurement is performed over a sequence of intervals; each interval being equal in length to the lead of the helix generated on the graph by the photocells.

In order to practically apply the slope measurement information from the photocell's output to a computer, for example, it is applied first to the control circuit shown in Figure 4. Pulse outputs from the photocells 8 and 9, due to a passage of the curve 20 on the graph, are applied to the gate circuits and to the bi-stable state trigger circuits to control the output of the continuously operating pulse source 43. This control of the pulse source output is such that pulses appear at one of the two output leads 38 and 42, depending upon a positive or negative slope of the curve, in a quantity depending upon the magnitude of the slope of the curve, to completely described the slope of the curve at the interval of sensing by the photocells.

The operation of the control circuit may be more completely understood by reference to Figure 5, wherein the first and second pulse records, at the top of the figure, refer to the outputs of photocells 8 and 9, on leads 25 and 29, respectively; the third and fourth voltage records refer to the control inputs to gates 23 and 27 by control leads 32 and 34, respectively; the fifth and sixth pulse records refer to pulses in lead 31 and 33, respectively; the seventh and eighth voltage records refer to the control leads 36 and 40, respectively; and the ninth and tenth pulse records refer to the output pulses in leads 38 and 42, respectively. In the exemplary operation of the control circuit shown in Figure 5, the first seven revolutions of the drum produce an output, first from photocell 8, then from photocell 9. As a result of this operation over seven revolutions of the drum, the voltage versus time record for control leads 36 and 40 shows that a constant low voltage is applied to gate 39 while the voltage to gate 35 intermittently rises to a level above its quiescent level.

A low control voltage applied to a gate prevents the passage of input pulses to its output, but a significant increase in the control voltage applied to a gate, as for example the intermittent values indicated for control leads 36 and 40 of Figure 5, opens the gate and allows a free flow of pulses from input to output. Due to an important built-in time delay in the trigger circuits, a pulse on leads 25 and 26 when control lead 32 is at a relatively low potential will not cause control lead 32 to be at a relatively high potential in time for this same pulse on lead 25 to pass through gate 23. Therefore, the trigger circuit 28 is not operated by an input on lead 31 until and unless two successive pulses appear on leads 29 and 30. A similar circumstance is true for gate 27. This is why, for example, leads 32 and 33 in Figure 5 remain unaltered during the first seven revolutions of the cylinder 3.

As a consequence of the constant low voltage to gate 39, during the first seven revolutions of the cylinder, no output pulses are passed from the pulse source 43 to the lead 42. However, during this same interval gate 35 experiences seven periods of being in an open condition and seven bursts of pulses from pulse source 43 appear in lead 38.

Rotations eight, nine and ten of the cylinder are characterized by an output pulse first from photocell 9, then from photocell 8 and bursts of pulses from lead 42, as shown in Figure 5. Thus, a change of the order of occurrence of output pulses from the photocells causes a change of leads in which an output from pulse source 43 appears. A change of the order of occurrence of output pulses from the photocells can only result from a change in the sign of the slope of the curve due to its passage through a maximum or minimum point. The detection of such a change is desirable, if not necessary, information when applying the nature of a mathematical curve to a computer, for example.

As can be seen by reference to Figure 5, the duration of the pulse output in leads 38 and 42, during a revolution of the cylinder, is proportional to the time spacing of occurrence of pulse outputs from photocells 8 and 9. By maintaining the frequency of pulses from pulse source 43 constant, the time spacing between pulse outputs from the photocells is proportional to the number of pulses appearing in leads 38 or 42 per revolution of the cylinder. Thus, a measure of the increase of the value of the dependent variable per unit change of the independent variable is given by the number of pulses appearing in leads 38 or 42 per revolution of the cylinder.

The present invention, therefore, senses the graph 17a and transforms the information thereon into electrical pulses such that they define a step function approximation to the mathematical curve on the graph.

While the present invention has been described as using photocells as sensing devices, these being convenient, accurate and preferred signal sensing devices, it is to be understood that other types of signal producing means may be mounted on cylinder 3 in the configuration of a graphical curve and pickups used that will sense the particular type of signal-producing areas used. Thus the curve 20 can be conductive and electrically connected to a suitable source, the pickups then being wiper contacts. Or, for example, the curve 20 may be recorded on magnetic material with magnetic pickups utilized.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. A function generator comprising a cylinder of light-transmitting material, said cylinder having a light-obstructing curve thereon, means for rotating said cylinder, a light source inside of said cylinder, two light-responsive pickups in fixed relation to each other and disposed adjacently and equidistant from the exterior of said cylinder, means for progressing said pickups together along said cylinder over a path parallel to the axis of said cylinder at a speed proportional to the rotational speed of said cylinder, and electronic means connected to said two pickups for converting time-spaced signals into a quantity of unit signals.

2. Apparatus in accordance with claim 1 wherein said curve represents a mathematical relationship between an independent variable and a dependent variable.

3. Apparatus in accordance with claim 1 wherein said curve represents a mathematical relationship between an independent variable and a dependent variable, and wherein said electronic means detects and transforms an output from said pickups to produce an output in pulse form that is related to said relationship of variables in said curve.

ROBERT D. HANCOCK.
LLOYD T. PROTHERS.

REFERENCES CITED

The following references are of record in the file of this patent:

UNITED STATES PATENTS

| Number | Name | Date |
|---|---|---|
| 2,228,782 | Sharples | Jan. 14, 1941 |
| 2,398,904 | Libman at al. | Apr. 23, 1946 |
| 2,493,519 | Baltosser | Jan. 3, 1950 |